(12) United States Patent  (10) Patent No.: US 7,815,253 B2
Kanamori  (45) Date of Patent:  Oct. 19, 2010

(54) STORAGE STRUCTURE FOR A COVER MEMBER OF A SLIDING ROOF TYPE VEHICLE AND A VEHICLE PROVIDED WITH THE SAME

(75) Inventor: Jun Kanamori, Yokosuka (JP)

(73) Assignee: Kanto Auto Works, Ltd. (JP)

( * ) Notice: Subject to any disclaimer, the term of this patent is extended or adjusted under 35 U.S.C. 154(b) by 0 days.

(21) Appl. No.: 12/209,121

(22) Filed: Sep. 11, 2008

(65) Prior Publication Data

US 2009/0102244 A1   Apr. 23, 2009

(30) Foreign Application Priority Data

Oct. 23, 2007   (JP) .............................. 2007-275814

(51) Int. Cl.
*B60J 7/06* (2006.01)
(52) U.S. Cl. ....................................... 296/219
(58) Field of Classification Search ................... 296/219
See application file for complete search history.

(56) References Cited

U.S. PATENT DOCUMENTS

2004/0090092 A1 *   5/2004   de Gaillard et al. ......... 296/222

FOREIGN PATENT DOCUMENTS

| FR | 2797816 | * | 3/2001 |
|---|---|---|---|
| JP | 1991-61419 U | | 6/1991 |
| JP | 06-183263 A | | 7/1994 |
| JP | 2002-046473 A | | 2/2002 |
| JP | 2003-507244 A | | 2/2003 |
| JP | 2005-313737 A | | 11/2005 |

| WO | 01-14157 A1 | 3/2001 |
|---|---|---|

OTHER PUBLICATIONS

Applicants hereby bring attention of the examiner to: Pending U.S. Appl. No. 12/209,085, Ryouta Fujishima, "Sliding Roof Structure and Vehicle Having the Same", filed Sep. 11, 2008.
Applicants hereby bring attention of the examiner to: Pending U.S. Appl. No. 12/209,114, Miyajima, et al., "Storage Structure for Storing a Cover Member of a Sliding Roof Type Vehicle and Vehicle Having the Same", filed Sep. 11, 2008.

(Continued)

*Primary Examiner*—Dennis H Pedder
(74) *Attorney, Agent, or Firm*—Chen Yoshimura LLP

(57) ABSTRACT

In a cover member storage structure that allows a user to manually move a folded cover member from a roof into a box in the vehicle interior, the cover member storage structure includes: a tray (30) on which a folded cover member (12) is placed; and a guide means (40) for guiding and supporting the tray (30) so that the tray (30) is moved from the first position (P1) at the rear side of the first rail (11b) to fold the cover member via a rotating position (P2) to the second position (P3) in the vehicle interior. The tray (30) is swung between the first (P1) and the second (P2) positions via a damper (37), and the guide means (40) includes: the second rails (41) along which the tray (30) is guided from the first position to the second position; and a biasing means (44) for biasing the tray (30) toward the roof position when the tray (30) is moved along the second rails (41).

11 Claims, 8 Drawing Sheets

OTHER PUBLICATIONS

Applicants hereby bring attention of the examiner to: Pending U.S. Appl. No. 12/209,130, Fujishima, et al., "Sliding Roof Structure and Vehicle Equipped with the Same", filed Sep. 11, 2008.

Japanese Office Action in counterpart application JP 2007-275814, dated Oct. 13, 2009, citing foreign patent document No. 1 above.

* cited by examiner

STORAGE STRUCTURE FOR A COVER MEMBER OF A SLIDING ROOF TYPE VEHICLE AND A VEHICLE PROVIDED WITH THE SAME

TECHNICAL FIELD

The present invention relates to a roof structure in which an opening section is provided on a vehicle roof, and which covers a cover member so that the opening section can be opened and closed. In particular, the present invention relates to a storage structure for a cover member of a sliding roof type vehicle for moving and storing a folded cover into a vehicle interior.

BACKGROUND ART

As shown in FIG. 8, so-called sliding roof type, canvas top type or open roof type vehicles (hereinafter referred to as a sliding roof type vehicle) 100 are well known, which have an opening section 111 on a roof 110, and the opening section 111 is covered with a cover member 120 which can be opened and closed. This conventional sliding roof type vehicle 100 is typically has slide rails 111b provided along both left and right sides of the opening section 111 on the roof 110, and along the slide rails 111b, a plurality of slide members supporting both edges of the cover member 120 are provided slidably in the front-and-rear direction of a vehicle. A plurality of slide members is provided in a longitudinal direction at the pre-determined distance on both edges of the cover member 120.

Depending upon passengers' mood or weather or temperature, the opening section 111 on the roof 110 is closed by moving each slide member and extending the cover member 120 forward along the slide rails 111b. Conversely, the roof 110 is opened when the cover member 120 is folded at a rear edge of the opening section 111, or rolled and wound up by moving backward each slide member along the slide rails 111b.

However, with such a sliding roof type structure, the folded cover member 120 closes a part of a rear edge of the opening section 111, that is, by length L1 in the longitudinal direction, and swells upward from the roof 110. Therefore, since the opening section 111 of the roof 110 has length L2 shorter by L1 than the total length L in its longitudinal direction, the open area of the opening section 111 of the roof 110 is smaller and its appearance is also deteriorated. When also a rear window 112 is opened, a rear edge 110a of the roof 110 and the folded cover member 120 are placed between an opening section of the rear window 112 and the opening section 111 of the roof 110. Thereby, feeling of openness is spoiled when a rear window 112 is opened.

JP 2005-313737 A discloses a vehicle roof storage structure wherein a storage space for a roof constituting member is provided behind a vehicle seat. The roof constituting member is stored in a package tray that is rotated by a rotating mechanism to store the roof constituting member into the storage space.

JP 2002-046473 A discloses a convertible vehicle roof wherein a front portion and a rear portion of the roof are movably supported on a vehicle body. The front and the rear portions of the roof are stored in a roof storage room. The front portion of the roof is swung when descending into the roof storage room by a swing supporting device, and stored diagonally or substantially vertically.

JP 2003-507244 A (corresponding to WO01/014157) discloses a detachable covering module in a passenger space of a vehicle and a vehicle provided with it wherein a cassette composing a slidable rear window along an arch-shaped roof side panel and a foldable flexible roof device on the cassette are supported.

In the roof storage structure disclosed in said JP 2005-313737 A, the storage space for a roof constituting member is relatively large, and especially long in the front-and-rear direction, causing a luggage space extremely small damaging convenience.

In the convertible vehicle roof disclosed in JP 2002-046473 A, similarly to the roof storage structure disclosed in said JP 2005-313737 A, the roof storage space is large, similarly causing a luggage space small damaging convenience.

In the detachable covering module in a passenger space of a vehicle disclosed in JP 2003-507244 A (corresponding to WO01/014157), the cassette composing a rear window and a flexible roof device slide along a roof side panel and stored inside a storage under a trunk floor. However, the covering module has a complex structure, and it is necessary upon storage to open a rear hutch, pull out a trunk floor backward, and introduce the cassette and the flexible roof device into the storage space. Therefore, complex operation is required for storage, and it is difficult, for example, to store or develop a roof while a driver or passengers stay in a vehicle.

Referring to the above-mentioned problems, the object of the present invention is to provide a storage structure for a cover member of a sliding roof type vehicle wherein a luggage space is not so small, a cover member constituting a roof is folded and stored, and a large opening area is maintained in a roof upon cover member storage.

SUMMARY OF THE INVENTION

In order to achieve the above-mentioned object, the first configuration of the present invention is a storage structure for the cover member in a roof structure for covering an opening section of a roof so that the opening section can be opened and closed. The roof structure is characterized to include: first rails that are provided on the left and right roof edges at the opening section and that guide the movement of the cover member; a tray provided behind the first rails on which the folded cover member is placed; a box provided behind the rear-most seat in a vehicle interior for storing the tray on which the folded cover member is placed; second rails for guiding the tray from the roof to the box; and a biasing means for biasing the tray toward the roof when the tray is moved along the second rails.

The second configuration of the cover member storage structure of an sliding roof type vehicle of the present invention comprises a cover member storage structure in a roof structure including a foldable cover member covering the opening section formed in a vehicle roof capable of open and close, and first rails that are provided on the left and right edges of the opening section and that slide the cover member in the front-and-rear direction of a vehicle, the cover member is slid to the rear side of the roof and is folded to open the opening section. The cover member storage structure is characterized to include: a tray on which the folded cover member is placed; and a guide means for guiding and supporting the tray so that the tray is moved between a first position at the rear side of the first rails and a second position provided behind the rear-most seat in the vehicle interior. The guide means includes: second rails for guiding the tray from the first position to the second position, and a biasing means for biasing the tray toward the first position when the tray is moved along the second rails.

The second position is preferably inclined so that the second position is provided at the lower side of the front side of the first position. The box is preferably adjacent to a rear seat.

DETAILED DESCRIPTION OF THE EMBODIMENTS

Figure 1:
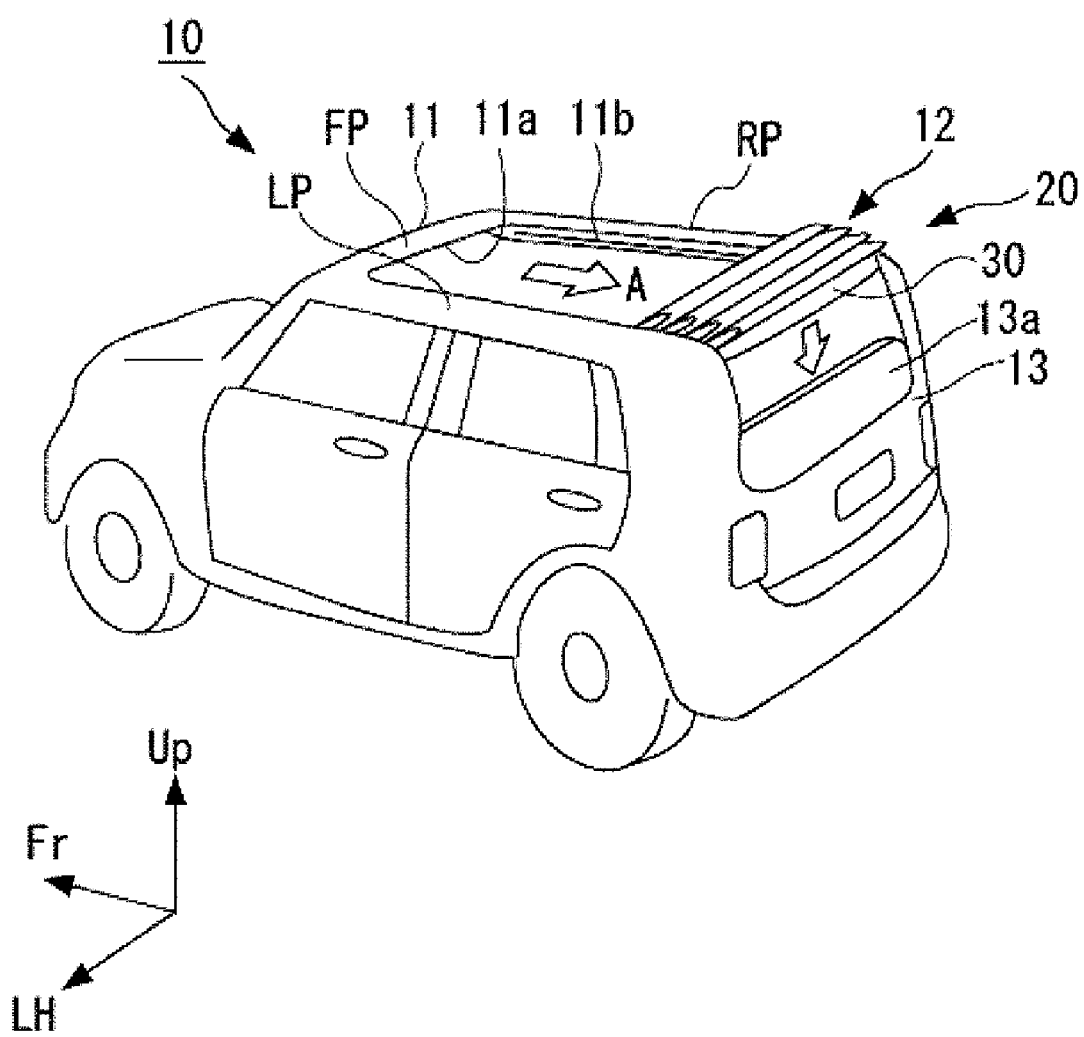
FIG. 1 is a perspective view illustrating the rear part of the vehicle using a cover member storage structure according to an embodiment of the present invention.

Hereinafter, the present invention will be described in detail based on embodiments shown in the drawings. In the drawings, Fr shows the front side of the vehicle, Up shows the upper side of the vehicle, and LH shows the left side of the vehicle in the vehicle width direction.

FIG. 1 shows a hatchback-type automobile 10 including one embodiment of a cover member storage structure 20 according to the present invention.

This automobile 10 has an opening section 11a at a roof 11. The opening section 11a is formed to have a wide space by cutting the roof so that a front panel FP and left and right panels LP and RP are left in a shape of a horseshoe or of a gate. The opening section 11a is covered capable of open and close with a foldable cover member 12. For example, when not in use or when it is raining, the opening section 11a of the roof 11 is entirely covered with the cover member 12, and when driving, the cover member 12 is folded and stored in a vehicle interior so that the opening section 11a can be opened.

In order to fold or extend a cover member 12, a pair of rails 11b are provided in the longitudinal direction of the vehicle from the front end of the opening section 11a to the rear end of the roof on the more or less recessed side edges below the left and right panels LP and RP of the roof 11. Hereinafter, the pair of rails 11b provided in the longitudinal direction of the roof 11 along the opening section 11a is referred to as first rails 11b. The cover member 12 slides in the longitudinal direction of the vehicle guided with the first rails 11b. More specifically, the cover member 12 slides backward to be folded smoothly, or slides forward to be extended to cover the opening section 11a of the roof 11.

The cover member 12 is made foldable with a water-proof canvas sheet to a size coverable the opening section 11a at a roof 11 so as not to cause a gap, thereby rain water is prevented from penetrating into a vehicle interior. To the cover member 12, a plurality of bar members (not shown) extending in the vehicle width direction are attached separated from each other at the pre-determined distance in the front-and-rear direction, and the tip ends of the respective bar members are protruded from the left and right edges of the cover member 12 to the outer sides in the vehicle width direction. Bend line or bending habits are provided at middle positions of cloth parts between adjacent bar members, and when the opening section 11a is opened, the cover member 12 is sequentially folded backward at the bend lines or bending habit portions. For example, for the cover member 12 having hill fold bend lines, the cloth parts between adjacent bar members are bent hill folded at bend lines, thereby the opening section 11a of the roof 11 is opened by sliding backward as shown with an arrow mark A and folding the cover member 12.

To the left and right tip ends of respective bar members which span in the vehicle width direction are provided slide members (not shown), and the cover member 12 is guided slidably in the longitudinal direction of a vehicle by hooking these slide members to the first rail 11b provided along the more or less recessed side edges below the left and right panels LP and RP of the roof 11.

Figure 2:
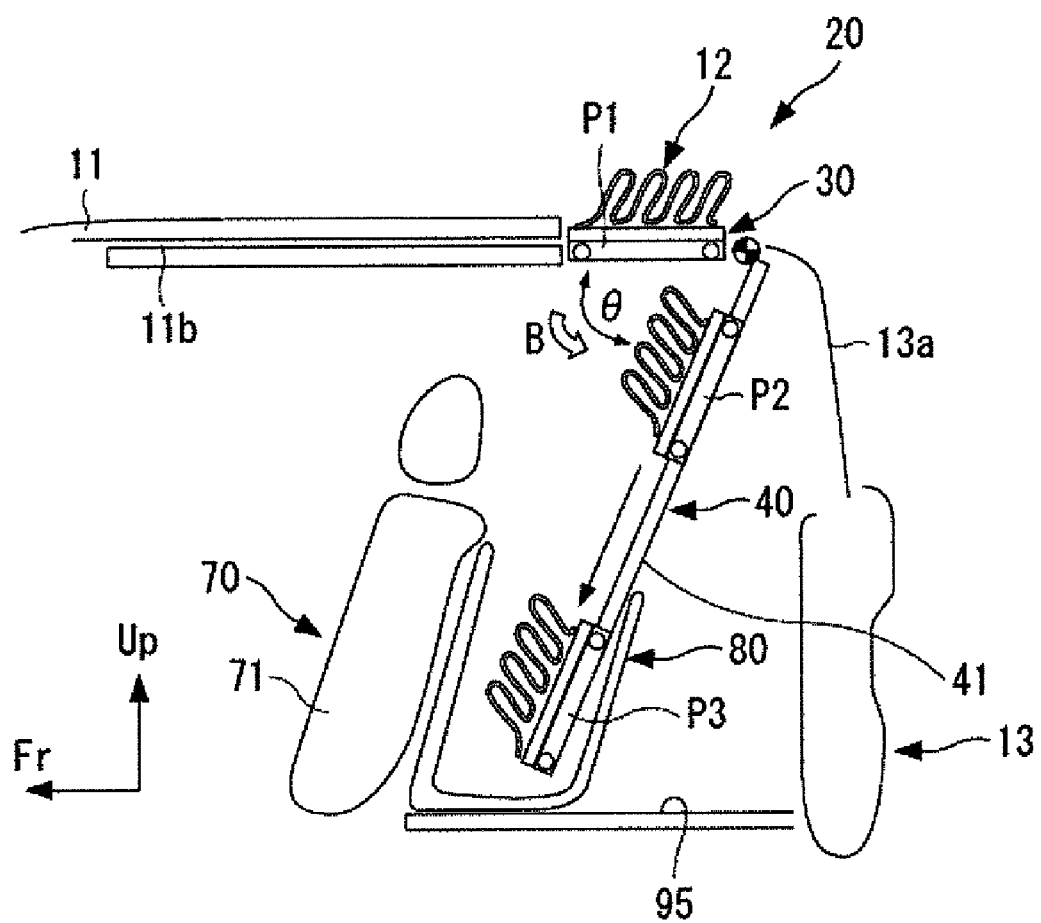
FIG. 2 is a schematic cross-sectional view illustrating the rear part of the vehicle of FIG. 1.

In the sliding roof type vehicle of the present invention, the folded cover member 12 can be stored by a cover member storage structure 20 into the vehicle interior. Specifically, as shown in FIG. 2, the cover member 12 folded at a folding position P1 (hereinafter, this folding position is referred to as a first position) of the cover member 12 at the rear part of the roof is moved to a storage position P3 (hereinafter, this storage position is referred to as a second position) at the lower side after rotated by about 90 degrees at a rotating position P2 of the cover member 1 (which will be described later). In order to fold the cover member 12 firmly and store it in the folded state into a vehicle interior, the cover member storage structure 20 includes, as shown in FIG. 2, a tray 30 on which the cover member 12 is placed in the above-described folded status and a guide means 40 for guiding the tray 30 to the storage position in the vehicle interior. The following section will describe the respective configurations.

[Configuration of Tray]

The tray 30 is formed to have a long flat rectangular shape that has a width substantially corresponding to the width of the opening section 11a in the vehicle width direction to place the folded cover member 12. In a preferable embodiment, the tray 30 constitutes a rear panel of the vehicle roof 11. In FIG. 1, when the rear window glass 13a of the rear door 13 is closed, the upper edge of the rear window glass 13a contacts the rear edge of the tray 30 water-tightly. Therefore, when the opening section 11a of the roof 11 is closed, the vehicle roof 11 can be closed water-tightly by a front panel FP, left and right panels LP and RP, the tray 30 constituting the rear panel, and the cover member 12 covering the opening section 11a. The lower face of the tray 30 constitutes a part of a ceiling in a vehicle interior at the above-mentioned folding position P1.

Figure 3:
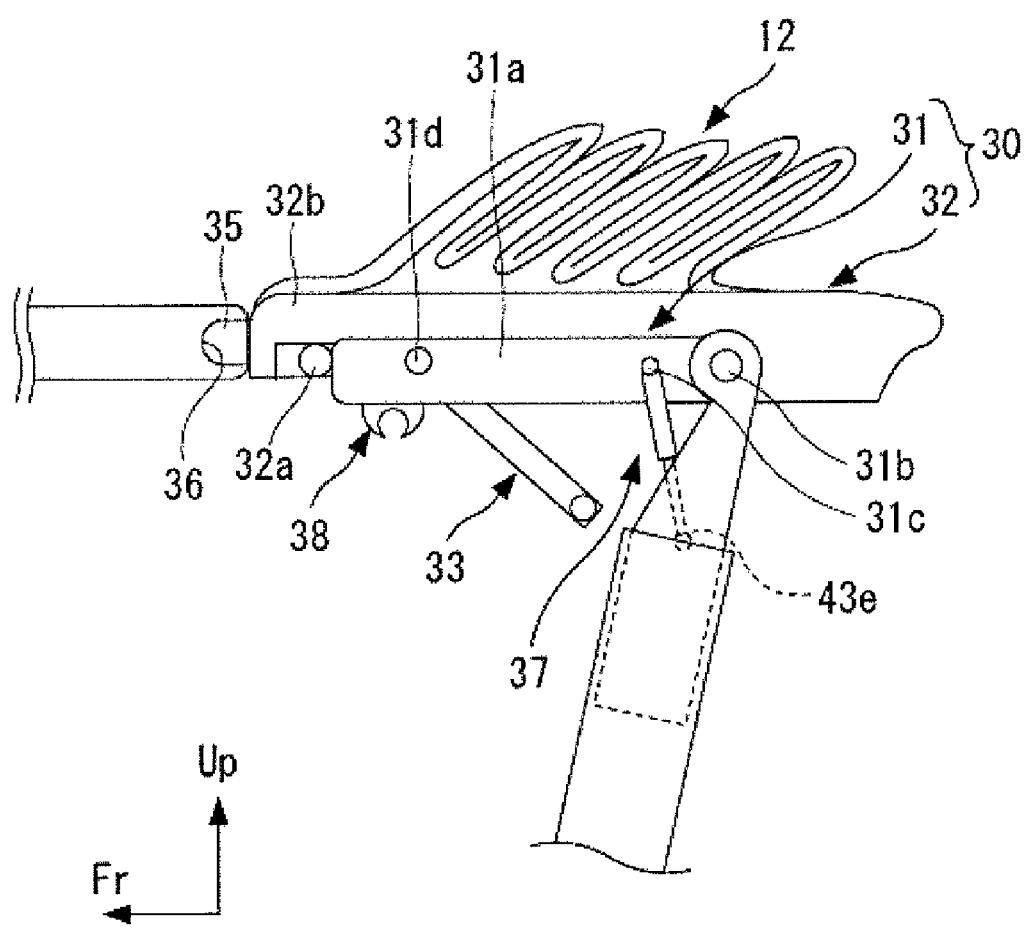
FIG. 3 is a side view illustrating a cover member storage structure according to the embodiment of the present invention.
Figure 4:
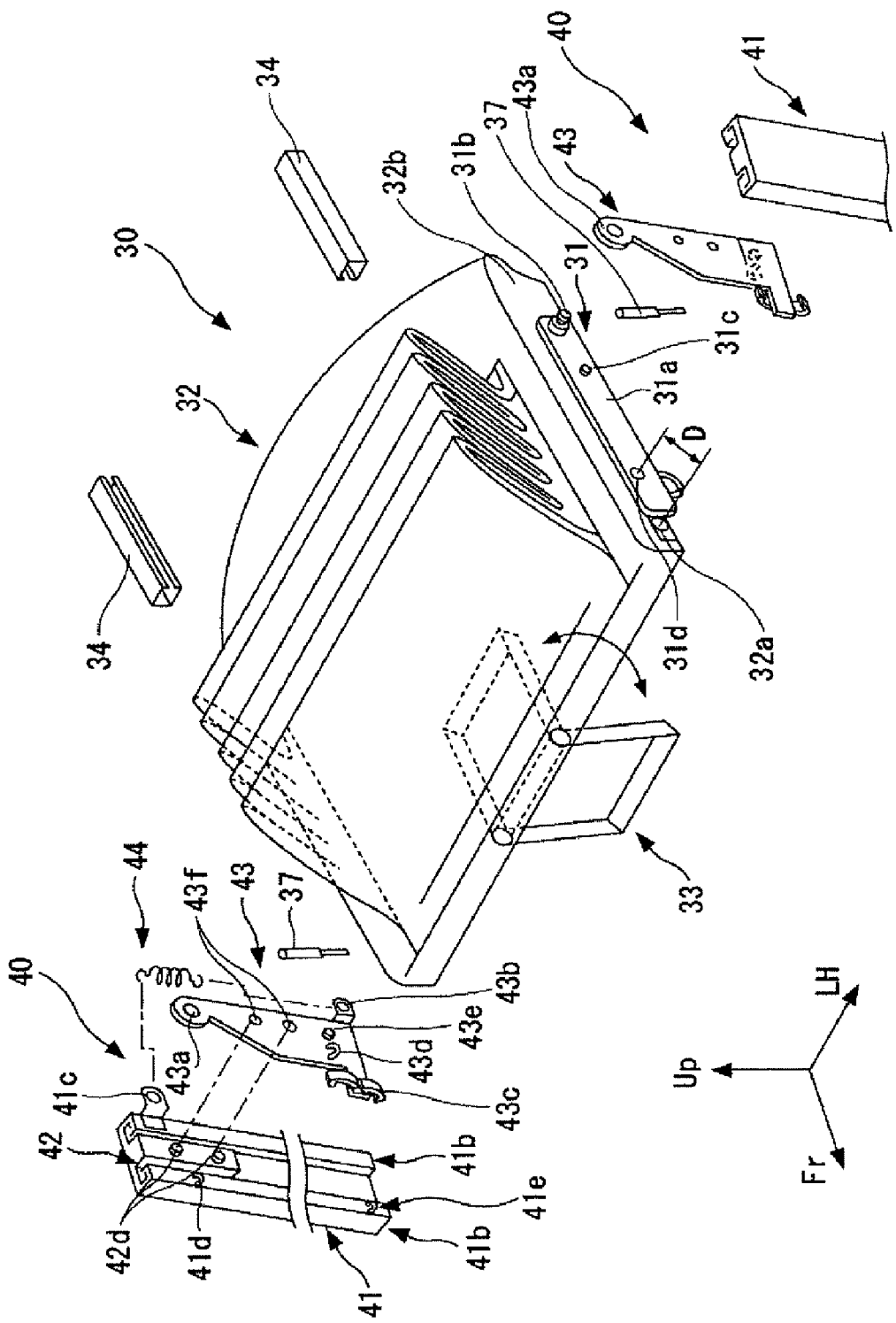
FIG. 4 is an exploded perspective view illustrating the cover member storage structure of FIG. 3.

As shown in FIGS. 3 and 4, the tray 30 comprises a base member 31 and a tray body 32 provided on the base member 31 and moving relatively forward and backward with respect to the base member 31, and on the tray body 32 is placed a cover member 12 folded wave-shaped as shown in FIG. 2. The base member 31 of the tray 30 has a plate member 31a that extends to the left and right ends in the front-and-rear direction of the vehicle. This plate member 31a has a surface facing to the outer side in the width direction of the vehicle. As shown in FIG. 4, the rear part of this plate member 31a has a cylindrical axis member 31b that is inserted to an axis-receiving section 43a of an elevating plate (which will be described later) and that protrudes to the outer side in the vehicle width direction. At the middle part of the plate member 31a in the front-and-rear direction, a pin 31c protruding to the outer side in the vehicle width direction is provided. One end of a damper 37 (which will be described later) is attached to the pin 31c. A lock hole 31d is formed at a position away to the rear side by a predetermined distance D from the front end of the plate member 31a.

The tray body 32 is provided on a base member 31 so as to move on rails (not shown). The movement of the tray body 32 to the base member 31 is regulated by lock pins 32a that are provided at the left and right side faces 32b of the tray body 32 in a retractable manner. The lock pins 32a are provided, as shown in FIG. 4, at positions closer to the front ends of the side faces 32b. The operation of the lock pins 32a is linked to the maneuver of a lever 33 that is attached to the base member 31 in a rotatable manner. It is noted that the lock pins 32a are biased by a spring (not shown) for example so that the lock pins 32a are always protruded to the outer sides.

As shown in FIG. 3, the tray 30 is structured so that the front ends of the plate member 31a are abutted to the lock pins 32a protruding to the outer sides to regulate the rearward movement of the tray body 32 on the base member 31. When the lever 33 is rotated to retract the lock pins 32a on the other hand, the tray body 32 can be moved to the rear side on the base member 31 and the tray body 32 moved for the predetermined distance D is locked by returning the lever 33 to the original position to allow the lock pins 32a to enter the lock holes 31d.

At the left and right sides of the tray 30, more specifically at the left and right sides of the tray body 32, storage rails 34 are provided that extend in the front-and-rear direction of the vehicle. A member for determining the position of the tray 30 to the body is provided so that the tip ends of the storage rails 34 are arranged at the rear ends of the first rails 11b of the roof 11. Specifically, as shown in FIG. 3, a convex section 35 protruding from the front end of the tray body 32 is fitted to a concave section 36 provided at the body side to link the first rails 11b to the storage rails 34 to constitute one rail. Thus, the cover member 12 can be smoothly moved from the first rail to the tray. When the tray body 32 is moved to the rear side with regards to the base member 31, the convex section 35 is disengaged from the concave section 36. By moving the tray body 32 to the rear side, the entire tray 30 can be smoothly swung around an axis member 31b. In other words, the tray 30 can be swung downward on the vehicle front side with the axis member 31b of the rear edge side of the tray 30 as a supporting point between the folding position P1 (first position) in FIG. 2 and the rotating position P2 obtained by the rotation from this folding position P1 in the direction shown by the arrow B by a predetermined angle θ.

In order to prevent a situation where the swift downward swing of the tray 30 due to its own weight when the tray 30 performs swinging action with a convex section 35 detached from a concave section 36, a pin 31c of a plate member 31a and a pin 43e of an elevating plate 43 (to be described later) are connected by a damper 37. By the damper 37, the accelerated downward swing of the tray 30 by its own weight is controlled, and the tray 30 can be connected to a lower second rail (which will be described later) by applying only slight pressing power or controlling power.

Further, the tray 30 has a first lock member 38 at the lower face at the front part of the base member 31. The first lock member 38 is detachably engaged with the third striker 43d of the elevating plate 43 (which will be described later). The tray 30 swings downward and its first lock member 38 is engaged to a third striker 43d of the elevating plate 43 for connecting the tray 30 on a second rail 41.

[Configuration of Guide Means]

The guide means 40 is to guide and support the movement of the tray 30 between the rotating position P2 and the storage position (second position) P3. This guide means 40 is composed of: the second rail 41; a slide member 42 slid on the second rail 41; an elevating plate 43 fixed to the slide member 42; and a spring 44 in which one end is connected to the upper part of the second rail 41 and the other end is connected to the elevating plate 43.

Figure 5:
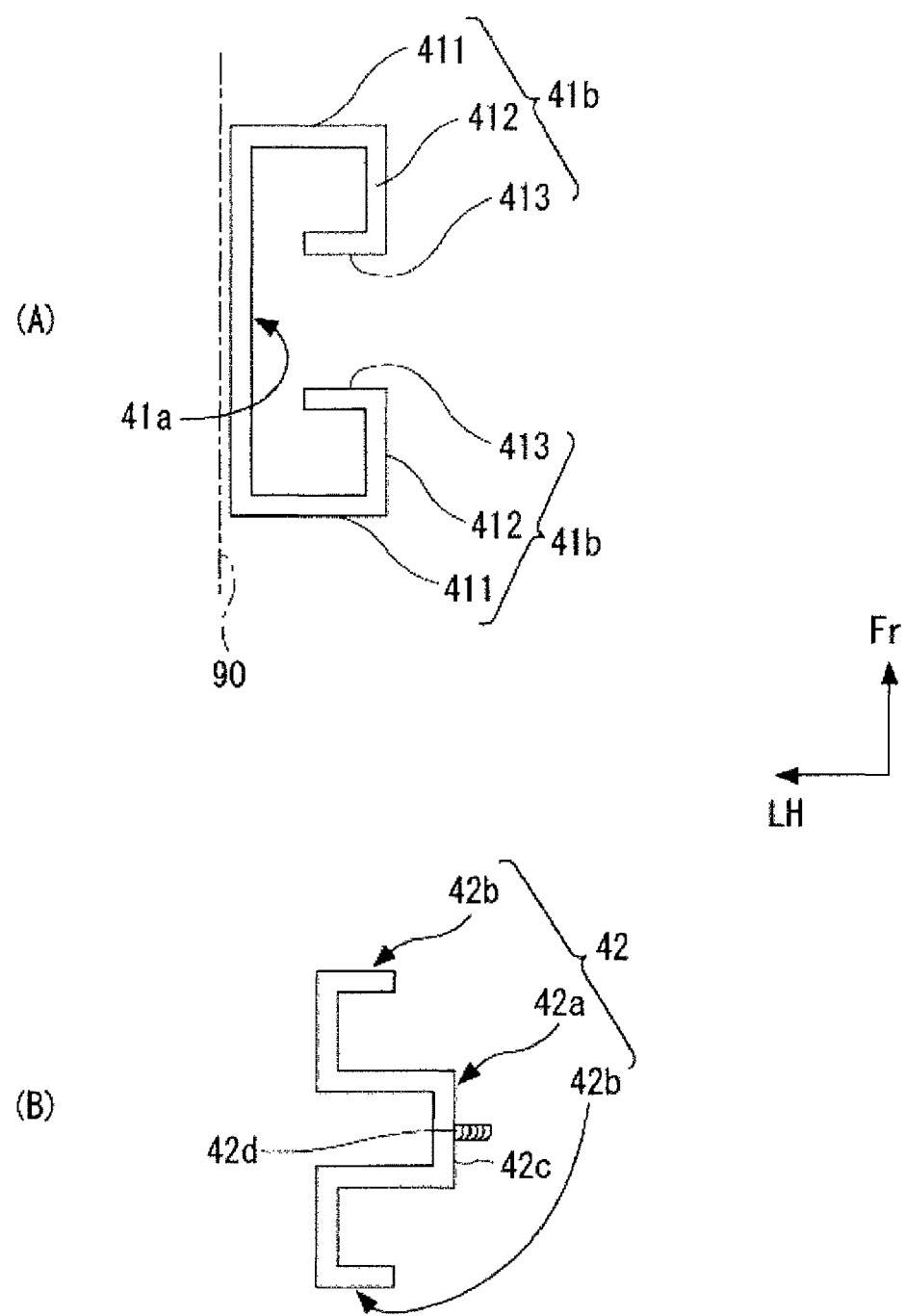
FIG. 5(A) illustrates the second rail according to the embodiment of the present invention.
FIG. 5(B) illustrates a slide member.

As shown in FIG. 2, the second rails 41 are provided at left and right inner wall faces, for example, at rear pillars of the rear part of the vehicle so that the lower ends are shifted and inclined to the front side of the vehicle than the upper ends, respectively. It is noted that the second rails 41 are selectively inclined so that the sliding faces of the slide member 42 faces to the inner side of the vehicle. Specifically, the left second rail 41 is composed of, as shown in FIG. 5(A), a base section 41a abutted to the left rear pillar 90 of the rear part of the vehicle and a slider supporting section 41b provided at both ends of the base section 41a. The slider supporting section 41b is composed of: a side wall section 411 raised from the edge of the base section 41a; an extended section 412 extending from the tip end of the side wall section 411 so as to be parallel with the base section 41a; and an inner wall section 413 extending from the tip end of this extended section 412 so as to be parallel with the side wall section 411. The inner wall section 413 is formed to have a narrower width than that of the side wall section 411. The right second rail 41 is similarly configured.

As shown in FIG. 4, the second rail 41 having the structure as described above has a bracket 41c for attaching one end of the spring 44 to the upper end of the slider supporting section 41b at the rear side. At the slider supporting section 41b at the front side of the second rail 41, the first and second strikers 41d and 41e are provided at the upper end and the lower end.

The slide member 42 is connected to the tray 30 via the elevating plate 43. When this slide member 42 is slid on the second rail 41, the tray 30 is moved in the up-and-down direction. This slide member 42 is composed, as shown in FIG. 5(B), of a body section 42a having a square U-like cross-sectional shape to which the elevating plate 43 is attached and a sliding section 42b having a L-like cross-sectional shape that extends from both ends of this body section 42a and that is inserted to the slider supporting section 41b of the second rail 41. Two screws 42d are protruded from a bracket attachment face 42c of the body section 42a.

The elevating plate 43 is structured so that the upper side has a triangular shape and the lower side has a rectangular shape. The elevating plate 43 has: the axis-receiving section 43a at the upper end for supporting the axis member; a bracket 43b that is provided at an edge at the rear side of the lower end and that supports the other end of the spring 44; the second lock member 43c that is provided at the front side of the lower end and that is engaged with the first and the second strikers 41d and 41e of the second rail 41; the third striker 43d that protrudes to the inner side of the vehicle and that is engaged with the first lock member 38 of the above-described tray 30; and the pin 43e for supporting the lower end of the above-described damper 37. This elevating plate 43 includes two holes 43f that are provided at the center in the surface and that are separated from each other in the front-and-rear direction. The elevating plate 43 is fixed to the slide member 42 by inserting the above-described screws 42d to the holes 43f and by screwing a nut (not shown).

Figure 6:
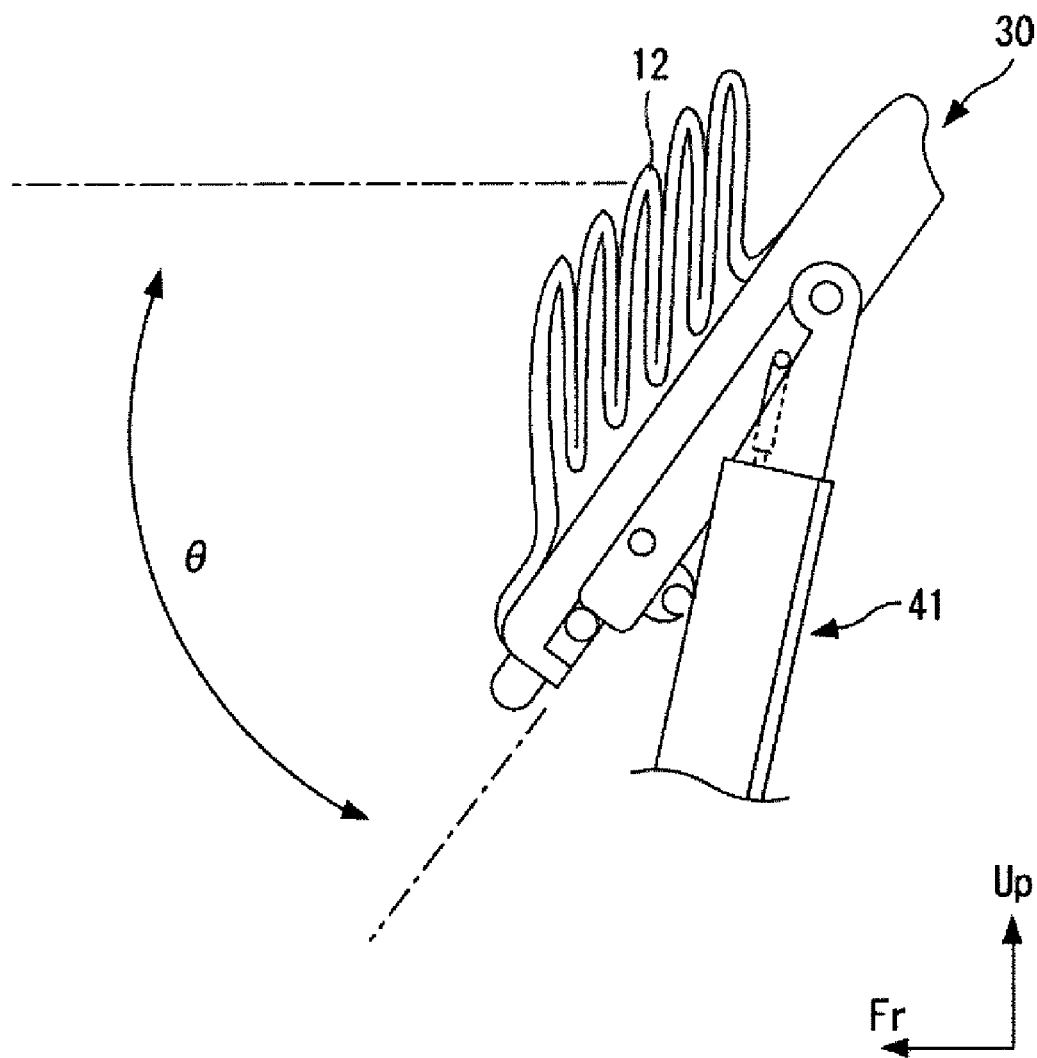
FIG. 6 is a side view illustrating the cover member storage structure according to the embodiment of the present invention.

The axis member 31b of the tray 30 is inserted to the axis-receiving section 43a of the elevating plate 43 and the pins 31c and 43e thereof are attached with the damper 37 to attach the tray 30 to the elevating plate 43 in a rotatable manner. It is noted that, when the tray 30 is swung from the folding position P1 (first position) to the rotating position P2, the first lock member 38 of the tray 30 is engaged with the third striker 43d of the elevating plate 43, thereby retaining the inclined posture of the tray 30 as shown in FIG. 6.

Figure 7:
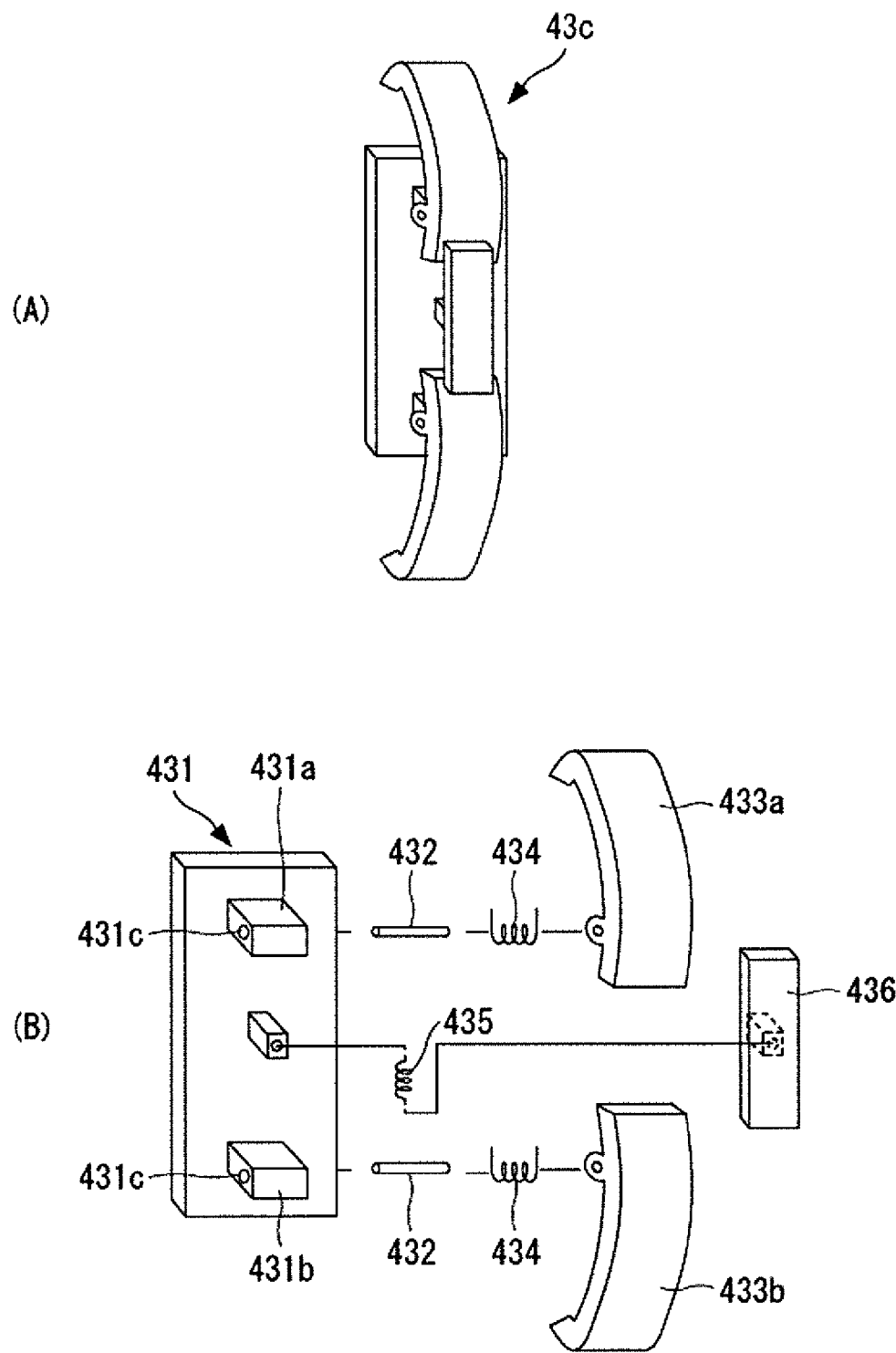
FIG. 7(A) is a perspective view illustrating the second lock member according to the embodiment of the present invention.
FIG. 7(B) is an exploded perspective view illustrating the second lock member according to the embodiment of the present invention.
Figure 8:
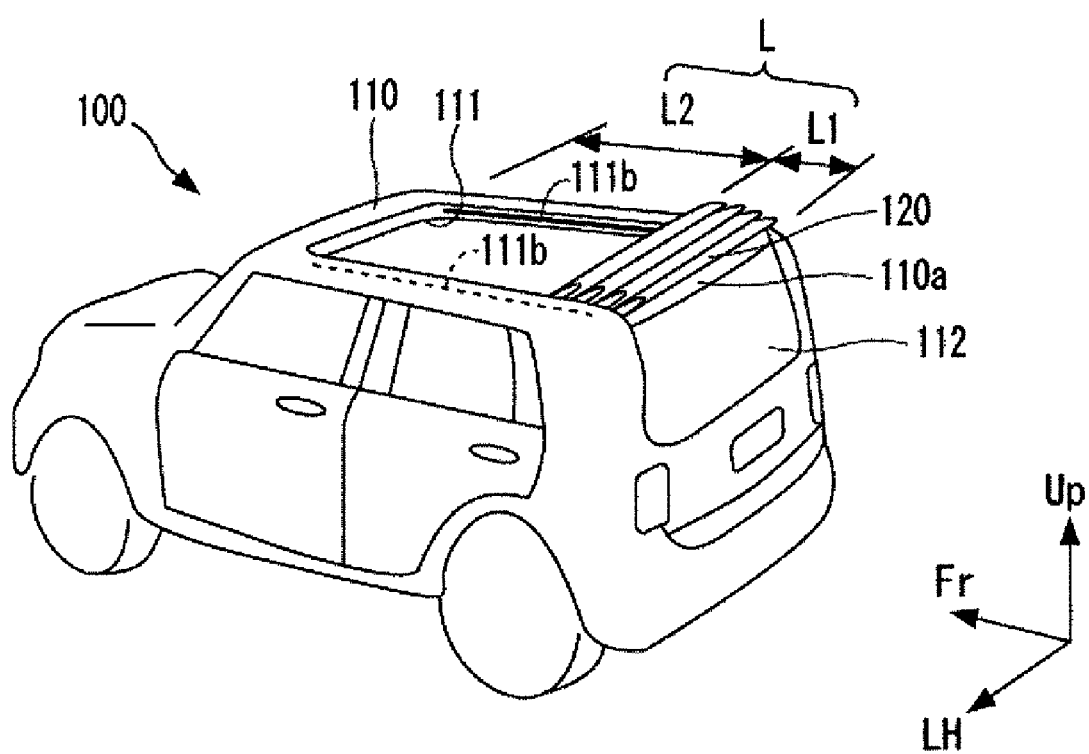
FIG. 8 is a perspective view illustrating a conventional sliding roof type vehicle.

As shown in FIGS. 7(A) and 7(B), the second lock member 43c of the elevating plate 43 is composed, for example, of: a base plate 431 that has lock piece supporting sections 431a and 431b protruding from one end and a face of the other end in the longitudinal direction in a vertical direction to the surface; pins 432 inserted to holes 431c provided at the tip ends of the lock piece supporting sections 431a and 431b; the first and second lock pieces 433a and 433b rotatably attached to the base plate 431 via the pins 432; springs 434 for biasing the first and second lock pieces 433a and 433b in the closing direction; and a button 436 that is abutted to ends of the first and second lock pieces 433a and 433b and that is attached to the base plate 431 via a spring 435. When the button 436 is depressed, the first and second lock pieces 433a and 433b are operated in the opening direction. The first lock piece 433a at the upper side of the second lock member 43c shown in FIG. 7(A) is engaged with the first striker 41d provided at the upper side of the second rail 41 and the second lock piece 433b at the lower side is engaged with the second striker 41e provided at the lower side of the second rail 41.

It is noted that the vehicle according to this embodiment has a structure as shown in FIG. 2 in which a storage box 80 is provided in the vehicle interior at the rear side of a seat back 71 of a rearmost seat 70. The storage position P3 (second position) of the tray 30 on which the folded cover member 12 is set in this storage box 80. The storage box 80 has a box-like shape in which the upper part is opened so that the storage box 80 can surround the tray 30 moved along the second rail 41 to the storage position P3. The storage box 80 is provided at a deck 95 for example.

The cover member storage structure according to the embodiment of the present invention has the configuration as described above. In order to close the opening section 11a of the roof 11 of the automobile 10, the tray 30 is positioned at the folding position P1 and the cover member 12 is drawn to the front side along the first rails 11b. This allows the cover member 12 to be developed to close the opening section 11a.

On the other hand, the tip end of the cover member 12 in the developed status is slid on the first rails 11b to the rear side and is slid on the storage rail 21a in the tray 21 positioned at the folding position P1 (first position) to fold the cover member 12 in this tray 21, thereby opening an opening section 11a.

Next, the lever 33 is rotated to retract the lock pins 32a from the side faces 32b of the tray body 32 to the inner side to allow the tray body 32 to be movable to the base member 31 in the rearward direction. When the rearward movement of the tray 30 causes the convex section 35 protruded from the front end of the tray 30 to be disengaged from the concave section 36 at the body-side, the tray 30 is swung around the axis member 31b due to the own weight. Specifically, the tray 30 is swung so as to lower the front part of the tray 30. In this case, the tray 30 is connected to a guide member 40 by a damper 37 and its swing speed is controlled to reduce acceleration. When the tray 30 is swung by a predetermined angle θ, the first lock member 38 provided in the tray 30 is engaged with the third striker 43d of the elevating plate 43. In this manner, the inclined posture of the tray 30 is retained as shown in FIG. 6.

When this tray 30 is at the rotating position P2, the elevating plate 43 has the first lock piece 433a of the second lock member 43c engaged with the first striker 41d at the upper side of the second rail 41, thus regulating the slide member 42 from being moved along the second rail 41 to the lower side. The button 436 of the second lock member 43c is depressed to operate the first lock piece 433a in the opening direction to cancel the engagement with the first striker 41d. When the lock is cancelled, a user may press the tray 30 to the lower side to move the tray 30 to the storage position P3.

When the tray 30 is moved to the second position, that is, the storage position P3, the second lock piece 433b at the lower side of the second lock member 43c is engaged with the second striker 41e provided at the lower end of the second rail 41. This allows the tray 30 to be retained at the storage position P3. It is noted that the above maneuver may be performed in an opposite order in order to move the tray 30 from the storage position (second position) P3 to the folding position (first position) P1.

According to the cover member storage structure 20 having the configuration as described above, the cover member 12 folded in accordance with the opening of the opening section 11a of the roof 11 can be moved from the roof 11 to the vehicle interior and the tray 30 having thereon the folded cover member 12 can be stored in the storage box 80 on the deck 95. This can prevent the folded cover member 12 from visually recognized from the outside of the vehicle. Thus, occupant(s) can sufficiently feel liberating through the opened roof 11 while maintaining the favorable appearance of the vehicle 10. Furthermore, the storage box 80 for storing the tray 30 is provided at the front region of the deck so as to be close to the rear sheet. Thus, a space for accommodating baggage can be secured on the deck 95.

Further, according to the cover member storage structure 20 of the present invention, when the tray is stored (i.e., when the tray is moved from the rotating position P2 to the storage position P3), the tray 30 is biased by the spring 44 toward the roof 11. Thus, the cover member 12 is prevented from being swiftly moved due to the own weight. Thus, a user can manually move the tray 30 slowly. Furthermore, when the tray 30 at the storage position P3 is moved to the rotating position P2, a labor required to raise the tray 30 can be reduced. In other words, the tray 30 biased toward the roof 11 allows the user to easily raise the tray 30.

Furthermore, the opening section 11a of the roof 11 of the automobile 10 does not have the tray 30 when the tray 30 is stored at the storage position P3. Thus, the opening section 11a may be integrated with the opening section of the rear window glass 13a, thus securing a large opening area. Thus, occupant(s) can sufficiently feel liberating.

The present invention may be carried out in various embodiments within a scope not deviating from the intention. Although the above description has shown a configuration in which the second rail is obliquely extended in the vehicle interior from the first position at the rear end of the roof, that is, the folding position of the cover member 12, to a position at the lower side of the front side of the first position (i.e., the second position for storing the tray), the second position also may be at a position just below or a position at the rear side of the lower side of the first position. The box also may be provided on the deck at the rear side of rear sheet to have a distance therebetween. The biasing means is not limited to a spring 44 and the tray 30 may be moved up and down electrically using an electric motor. A cover member may not necessarily be made with canvas sheet. For example, a plurality of narrow width panels are made with plastics, wood, or steel, and a plurality of these panels may be connected as a foldable cover member 12.

According to the present invention, the cover member folded in accordance with the opening of the opening section of the roof can be moved from the roof into a vehicle interior and a tray on which the folded cover member is placed can be stored in the box. During this storage, a biasing means such as a spring is used to bias the tray toward the roof. Thus, the tray is prevented from being swiftly lowered due to the own weight and a user can manually move the tray. The tray biased toward the roof also can allow, when the user desires to raise the tray in order to take the cover member, the user to raise the tray easily. Storing or opening operation can be performed electrically, then electric power consumption can be reduced.

What is claimed is:

1. A cover member storage structure in a roof structure for covering an opening section of a roof by a cover member so that the opening section can be opened and closed,
   the roof structure including:
   first rails that are provided at the opening section and that guide the movement of the cover member on the roof;
   a tray on which the folded cover member is placed, a lower face of the tray constituting a part of a ceiling in a vehicle interior at folding position of the cover member;
   a box that is provided on a deck in a vehicle interior and that stores the tray;
   second rails for guiding the tray from the roof to the box, the second rails being provided at inner wall faces at rear part of the vehicle and inclined so that lower ends of the second rails are closer to front part of the vehicle than upper ends of the second rails, and
   biasing means for biasing the tray toward the roof when the tray is moved along the second rails,
   wherein the tray has storage rails to permit the movement of the cover member from the first rail to the tray.

2. The cover member storage structure according to claim 1,
   wherein the box is adjacent to a rear seat.

3. The cover member storage structure according to any one of claims 1 and 2,
   wherein the cover member is made of a canvas.

4. The cover member storage structure according to any one of claims 1 and 2,
   wherein the tray comprises a base member, a tray body movable forward and backward with regard to the base member, a storage rail extending on the both left and right sides of the tray body in the front-and-rear direction of a vehicle, and a convex portion protruding from the front end of the tray body,
   by the convex portion inserted in a concave portion formed on the body side, the tray body is located so that the front end of the storage rail is aligned with the rear end of the first rail, and
   when the tray body is moved backward with regard to the base member, the convex portion is detached from the concave portion.

5. The cover member storage structure according to claim 4,
   wherein it is provided with a control means for controlling the backward movement of the tray body with regard to the base member.

6. The cover member storage structure according to claim 4,
   wherein it is provided with a slide member sliding on the second rail and an elevating plate fixed to the slide member,
   the base member has an axis member, the elevating plate has a bearing for supporting rotatably the axis member, the tray is supported pivotably on the elevating plate, and
   when the tray body is moved backward with regard to the base member and the convex portion is detached from the concave portion, the tray swings around the axis member.

7. The cover member storage structure according to claim 6,
   wherein a damper is provided between the base member and the elevating plate for controlling swing of the tray due to its own weight.

8. The cover member storage structure according to claim 6,
   wherein the biasing means is a spring one end of which is connected to the upper portion of the second rail whereas the other end is connected to the elevating plate.

9. The cover member storage structure according to claim 6,
   wherein the elevating plate has a lock member for engaging with a striker provided on the upper side of the second rail, and
   by engaging the lock member with the striker, the elevating plate is held on the upper side of the second rail.

10. The cover member storage structure according to claim 6,
    wherein the elevating plate has a lock member for engaging with a striker provided on the bottom side of the second rail, and
    by engaging the lock member with the striker, the elevating plate is held on the bottom side of the second rail.

11. A vehicle comprising at least a roof having an opening section, a frame to support the roof, and a cover member storage structure in a roof structure for covering the opening section of the roof by a cover member so that the opening section can be opened and closed,
    the roof structure including:
    first rails that are provided at the opening section and that guide the movement of the cover member on the roof;
    a tray on which the folded cover member is placed, a lower face of the tray constituting a part of a ceiling in a vehicle interior at folding position of the cover member;
    a box that is provided on a deck in a vehicle interior and that stores the tray;
    second rails for guiding the tray from the roof to the box, the second rails being provided at inner wall faces at rear part of the vehicle and inclined so that lower ends of the second rails are closer to front part of the vehicle than upper ends of the second rails; and
    biasing means for biasing the tray toward the roof when the tray is moved along the second rails,
    wherein the tray has storage rails to permit the movement of the cover member from the first rail to the tray.

* * * * *